United States Patent [19]
Fernandez, Sr.

[11] 3,785,498
[45] Jan. 15, 1974

[54] HELICAL COIL FILTER APPARATUS
[76] Inventor: John J. Fernandez, Sr., 144 Encinitaz, Monrovia, Calif. 91016
[22] Filed: Jan. 19, 1971
[21] Appl. No.: 107,628

[52] U.S. Cl................ 210/351, 210/359, 210/444, 210/488
[51] Int. Cl............................................ B01d 33/00
[58] Field of Search.................... 210/91, 351, 497.1

[56] References Cited
UNITED STATES PATENTS
2,785,804  3/1957  Fernandez ............................ 210/91
1,150,910  8/1915  Warmington ................ 210/497.1 X
2,342,669  2/1944  Hoffman ...................... 210/497.1 X Primary Examiner—Samih N. Zaharna
Assistant Examiner—Robert H. Spitzer
Attorney—Louis A. Scholz

[57] ABSTRACT

This invention relates to fluid filtering devices and more particularly to the improvement in multiple nested helical coil filters that are used to separate solid particles from fluids and gases, fluids from gases, and fluids from fluids; comprising a leeward coil of substantially smaller diameter than the adjacent main filter coil.

4 Claims, 5 Drawing Figures

PATENTED JAN 15 1974　　3,785,498
FIG. 1.
FIG. 2.
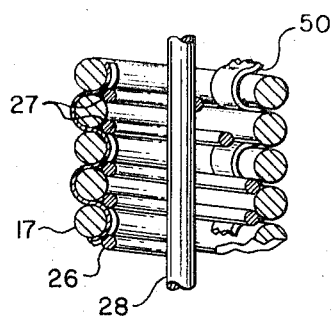
FIG. 3.
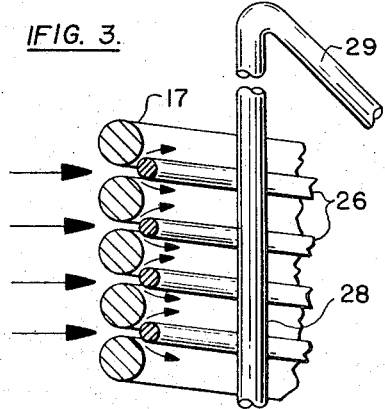
FIG. 4.
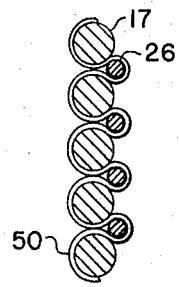
FIG. 5.
INVENTOR
John J. Fernandez

HELICAL COIL FILTER APPARATUS

CROSS REFERENCE TO RELATED APPLICATIONS

This is an improvement on "Fluid Filter", U.S. application Ser. No. 541,171 issuing into U.S. Pat. No. 2,785,804 by the same inventor.

BACKGROUND OF INVENTION

This equipment is one of a series of similar pieces of equipment that have been constructed from time to time for selectively applying, controlled openings, lattices, in order to separate conglomerate mixtures of solids, liquids and gases into one or more components.

The Prior Art consists largely of screen and sieve type filter moderators that are described in the References cited in U.S. Pat. No. 2,785,804.

SUMMARY OF INVENTION

This device consists essentially of an external input and an internal delivery receptacle portion, separated by a wall like portion, comprised of a pair of helically wound coil members to form a tubular longitudinally disposed chamber for receiving fluid from an inlet and delivering it to an outlet. This pair of helically wound coil springs form a chamber, having within the convolution of the first formed coil member a second coil formed member made of wire of substantially smaller diameter, which cooperates having its coil winding located in the crevices or grooved space formed by the adjacent coils of the convolutions of the first and larger spring formed chamber.

DESCRIPTION OF THE DRAWINGS

FIG. 1 is a sectional view in elevation of a filter embodying the invention.

FIG. 2 is a sectional view along line 2—2 of FIG. 1.

FIG. 3 is an enlarged sectional view along 1—1 of FIG. 1 illustrating fluid flow path.

FIG. 4 is a detail of a modification of the cross-section along line 2—2 of FIG. 1. subject invention FIG. 5 is detail of edge notches.

Referring to FIGS. 1 and 2 of the drawings, wherein there is shown a preferred embodiment of the novel filter unit, constructed and arranged in accordance with the present invention, the number 10 indicates a receptacle or casing which may be of the conventional "can" type frequently employed in an automotive lubrication systems. The casing includes a top wall or cover portion 11 provided with a fluid inlet connection 12, and a central aperture 13 through which the filter connections are made with an outlet connection 14 as hereinafter more fully described. A drain plug connection 15 is located in the bottom wall of the casing 10 for draining off any foreign matter that may collect in the bottom of the receptacle as a result of the filtering operation. The cover forms a sealed closure for the casing 10 by means of a suitable gasket indicated by the numeral 16 or the cover may be welded to the body 10 if desired.

The novel filter unit includes a helically wound coil spring 17 in the form of a tubular longitudinally disposed chamber for receiving fluid from the inlet and delivering it to the outlet 14. The convolutions of the helix are preferably of metal wire of relatively large cross-sectional area as shown in FIGS. 2 and 3, but any material, such a plastic or glass or other non-metal, having inherent resiliency may be employed.

The coil spring filter element 17 is suspended in the casing 10 by attaching the upper end coils to a support plate number 18 and secured at the aperture 13 in any suitable manner as by solder or brazing or adhesive fastening as indicated by the numeral 19. The invention further contemplates securing the upper end of the filter coil 17 directly to the casing cover 11 as opposed to the alternative plate connection and thus make the filter a unitary structure with the cover 11 as a single unit. Whichever construction is employed, the upper end of the filter coil is fixed rigidly to its support to effect the twisting movement of the filter coils. Which changes the effective length of the filter chamber and consequently the size of the filter openings.

The plate 18 is provided with an aperture 20 for receiving a hollow "T" shaped connection 21 including the outlet 14 and a filter actuator. The upper extremity of the coil 17 is rigidly or integrally attached to cover aperture 13 by solder or brazing as indicated by the numeral 22. The lower extremity of the coil 17 is closed by a disc or plug member 23 rigidly united thereto in any suitable manner as by soldering or brazing 24 to form a torque member with rod 28 for twisting the filter coils as hereinafter more fully described.

Associated with the coil spring member 17 is a second coil spring member 26 of smaller cross-sectional area wound for insertion within the convolutions of the first spring and having its coil windings located in the crevices or grooves formed by the adjacent coils or convolutions of the first or larger spring as indicated by the numeral 27 and shown in FIG. 2.

When the two spring coils are utilized, the second coil spring filter has its upper and lower extremities attached to each other. With this construction the dual elements are adjustably operated together as a unit to regulate the tension or interwire contact and to control the resultant openings and therefore the filtering of fluid passing between the elements of the coils. The twisting movement of the coils is accomplished by a longitudinally disposed rod member 28 passing through the opening formed by the adjacent ends of the coils and having one end rigidly secured to the lower end of the coils of the springs by means of the closure plate 23. The rigid connection may be made by any suitable means such as threads, solder or welding. The rod member 28 projects above the top of the fitting connector member 21 and connects with a lever arm 29 by means of a threaded fitting connector portion 30. This threaded fitting is a part of the outlet connection 14 and the threads of the connector clamp portion 30 are relatively fine or low pitch as indicated by the numeral 31 so as to provide a binding and holding action by tightening the connector clamp 31. When the rod is twisted to transmit a torque force on closure plate 23 which in turn causes a relatively lateral expansion of the filter spring coils 26 in relation to coils 17, which adjusts the filter to accommodate a particular kind of fluid or particle. To further assist the holding action, the arm 29 is bent in the form of a handle to engage a cooperating control member 32 located on the filter casing 10 and having a plurality of spaced notches 32'-32'. These notches are also employed to indicate the adjusted position of the filter springs. When the filter is used on an automotive device using standard viscosity grades of oil (ie 10, 20, 30, and 40, for example)

the notches may be accompanied by associated indicia markings so that the operator will know how to adjust the filter coils in order to obtain the most efficient results from the filter. This flexing or self-cleaning action can be accomplished by attaching the lever arm 29 at either top or bottom. Lever arm 29 can be manually activated or by vacuum or other pressure source, ie electric power, or an attached weight to produce the twisting movements of the coils.

To further aid in the filtering operation, the interior of the filter can 10 is provided with a funnel shaped metal member 33 having an opening 34 terminated below the lower extremity of the spring filter unit. The funnel with its sloping sides causes the heavier particles or foreign matter in the fluid to gravitate along the can body and past the filter and settle in the bottom of the casing and thereby eliminate them from the fluid circuit. Thus avoiding repeated exposure of the separated material to the filter screen, or unduly clogging the filter upon recirculation of the fluid in the system to be filtered.

Having thus described the novel filter arrangement, the operation is carried out in the following manner. Fluid is admitted to the casing 10 by inlet 12 under pressure and forced through the spring coils forming the filter chamber and thence through the outlet 14 and recirculated in a conventional manner. The degree of filtering is regulated by the interaction of the cooperating coil springs 17 and 26. One important feature of the present construction is that the coils can be expanded laterally without any appreciable longitudinal distention or elongation of the spring chamber as a whole. The provision of a large spring coil 17 and a cooperating smaller spring coil 27 causes a definite change of ratio of transverse movement during the application of torque which produces a controlled degree of filtering not heretofore attained. Further, by having the coil of smaller diameter wire to the lee of the coil of larger diameter wire, there is a special action shown in FIG. 3 wherein the fluid flowing in the direction shown by the arrows, either because of clogging or momentary excess of pressure acting against the natural resiliency of the wire, causes said wire 26 to be forced away from wire 17 momentarily forming an enlarged opening between contact surface of wire element contact area 27, and this process being of a vibratory nature similar to that of a clarinet reed, acts as a release for momentary over pressures and produces a self cleaning action. As illustrated schematically in FIG. 3 it will be noted that as the larger coils 17 are expanded transversely, the inner coils tend to move inwardly into the larger coil crevices and exert contact pressure commensurate with the torque pressure applied to the actuator rod 28 by the lever 29. The filter coils may be calibrated in tension and so held by the lever 29 and one of the notches 32' so that the spacing may be set with great accuracy to take care of a wide range of fluids having widely different characteristics. While the filter has been shown as calibrated for different grades of oil, it may also be calibrated to take care of liquids such as water and the like. In summary, it should be noted that by rotating the inner and outer coils at the same time in one direction, the size of the openings 17 are enlarged, while rotating oppositely the size of the openings is reduced.

A modification of the helical coil filtering device is shown in FIG. 2 wherein two or more, ideally three, flexible metal or plastic ribbon spacer 50 are interwoven between the coil elements 17 at points generally equidistant from each other (when considering the coil from its circular aspect). These serpentine intertwined spacers can be woven on the inner coil or the outer coil; or between the elements of both coils as shown in FIG. 4. In the contemplated device, it appears that interweaving on the outer coil only, as opposed to the inner coil only, produces a more uniform filtering action. The ribbons 50 tend to keep control of the minimum distance that the coil elements can approach each other, and thus control the size of the particle generally passed by the filtering action.

Where the interleaving is solely limited to the inner coil (not shown) there is produced a compound filtering action. That is, a gauged or controlled filtering between one pair of spiral elements 26 and an ungauged filtering action between the next adjacent pair of filtering elements 26.

Another modification of the invention using ribbon spacers is shown in FIG. 4, wherein the serpentine weaving of the ribbon spacers 50 are so arranged that the thickness of spacers is doubled between the pairs of outer coil elements 17, while only a single thickness is placed between any inner coil element and its adjacent outer coil element. The result of such an arrangement is that the outer coil filter elements act as a filter "aid" and coarsely screen particles of a specific size and larger, while the inner filter elements filter all particles one half the specified size, this greatly improving the efficiency of the action.

What I claim is:
1. A fluid filter unit comprising,
   a. a first elongated member, wound to form a spiral, coil form, chamber, having at least one exit opening at an end of said spiral coil,
   b. a second elongated member wound externally of and around the first coil member, the cross-section diameter of the second elongated member, being greater than that of the first elongated member, the coils of (the second) said first member resting (externally) internally adjacent and between the substantially adjacent (first) second member spiral coil elements, said first elongated member being resilient and being arranged with respect to the second elongated member so that during filtration said first elongated member vibrates and acts as a release for momentary over pressure and produces a self cleaning action,
   c. means for securing each end of both the first and second coil member to its counterpart to form a bifilar unit,
   d. a means for twisting axially one end of said unit with respect to the other end,
   e. a casing means external of said unit with an inlet port and an outlet port, said outlet port being connected by a conduit to said first member exit opening.
2. A device as in claim 1 wherein,
   a plurality of ribbon spacer means are intertwined between the elements of said second wound member at positions substantially equidistant from each other around the perimeter of the spiral.
3. A device as in claim 1 wherein,
   a plurality of ribbon spacer means are intertwined between the elements of said first wound member at positions substantially equidistant from each other around the perimeter of the spiral.

4. A device as in claim 1 wherein,
a plurality of ribbon spacer means are each intertwined between the two elements of said second wound member, then wound around the adjacent element of said first wound member and again in a reverse direction wound between the said two elements of said second wound member and then wound between the next adjacent pair of elements of said second wound member forming a double thickness spacer between the adjacent elements of said second wound member, and forming a single thickness spacer between the adjacent elements of said first wound member and these ribbon spacer means being positioned substantially equidistant from each other around the perimeter of said spiral.

* * * * *